Feb. 23, 1943.　　W. C. GARDINER　　2,311,744
MERCURY AMALGAM DECOMPOSITION CELL
Filed Aug. 19, 1939　　2 Sheets-Sheet 1
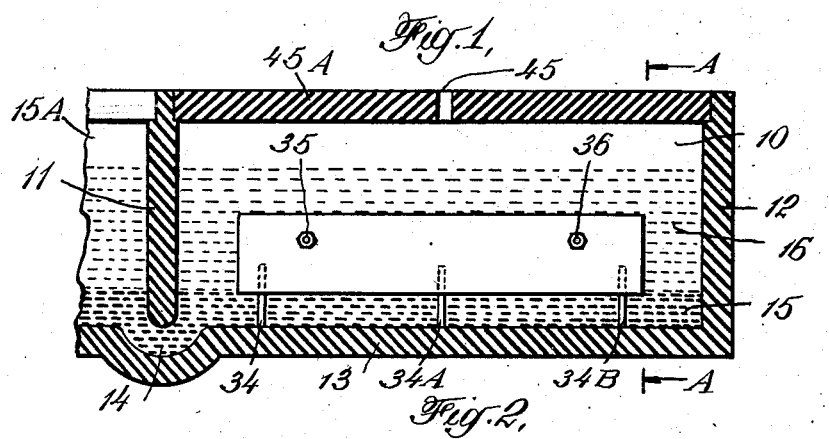
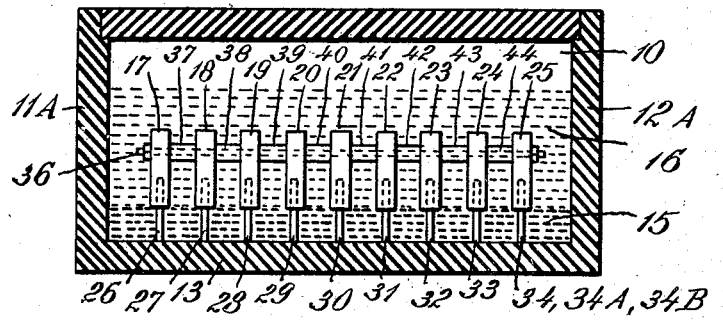
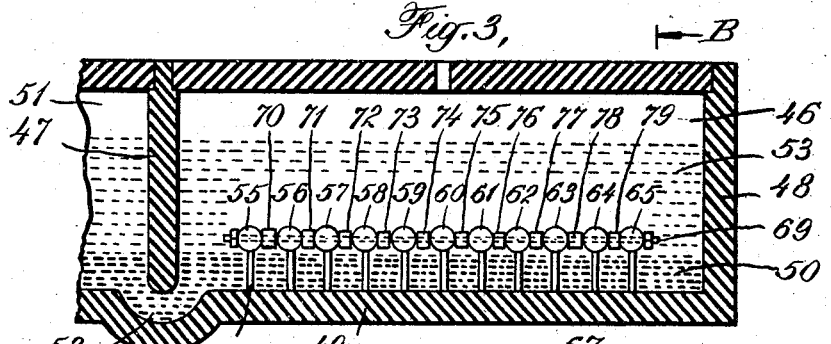
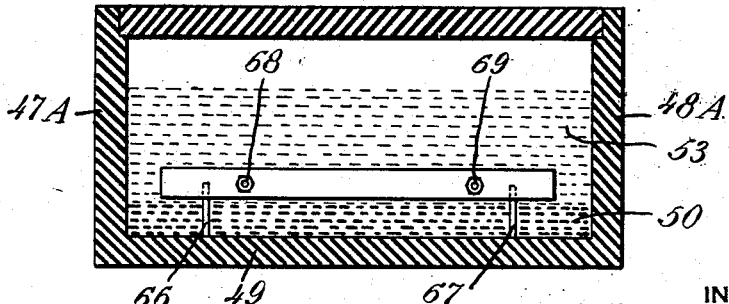
INVENTOR
William C. Gardiner
BY
ATTORNEYS

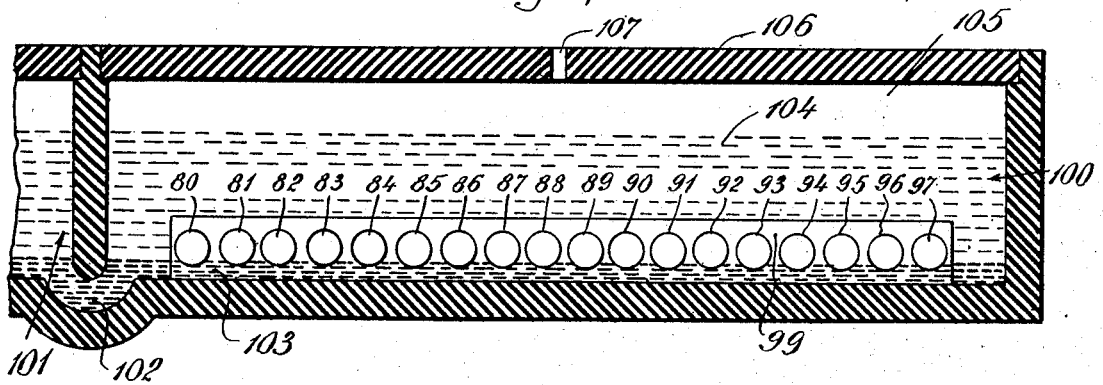
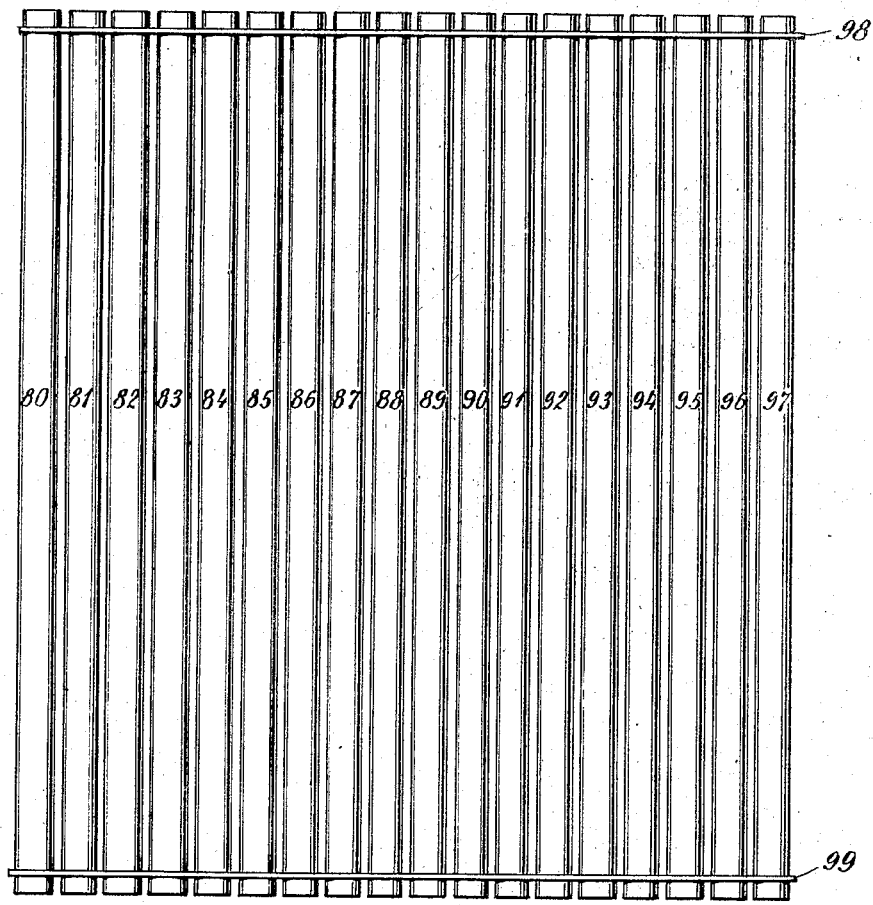

Patented Feb. 23, 1943

2,311,744

UNITED STATES PATENT OFFICE 2,311,744

MERCURY AMALGAM DECOMPOSITION CELL

William C. Gardiner, Niagara Falls, N. Y., assignor to The Mathieson Alkali Works, Inc., New York, N. Y., a corporation of Virginia Application August 19, 1939, Serial No. 291,000

2 Claims. (Cl. 204—221)

This invention is concerned with decomposition of amalgams of alkali metals, such as sodium and potassium. It provides improvements in mercury cells and the like to the end that such decomposition shall be facilitated and the alkali metal released more readily for reaction with water.

In the electrolysis of alkali metal salts, an alkali metal amalgam is formed in an anode or amalgam-forming compartment, brought into contact with an aqueous electrolyte in a cathode or decomposition compartment and there decomposed, the released alkali metal reacting with the water of the electrolyte to form alkali metal hydroxide and hydrogen gas which is discharged at a cathode. Carbon and graphite are satisfactory cathode materials because they offer a relatively small resistance to the discharge of hydrogen and do not amalgamate and thus become coated with mercury, but they offer a high resistance to discharge of alkali metal. By coupling the carbon or graphite cathode electrically to the amalgam, which acts as anode in the decomposition compartment, the short-circuit developed facilitates the release of the alkali metal from the amalgam and permits the cell to operate with a higher current efficiency than otherwise would be attained. Decomposition of the amalgam is facilitated further, and cell efficiencies consequently improved, if the cathode is electrically coupled to the amalgam by means of a metal member making a contact of low electrical resistance both with the carbon or graphite cathode and with the amalgam.

As a result of my investigations, I have developed a novel cathode structure that employs this principle to facilitate amalgam decomposition which has several advantages. In the cathode structure of my invention, the carbon or graphite cathode elements are short-circuited by metal members disposed to make low resistance electrical connection between the cathode elements and the amalgam in the cell and to support the cathode elements above the bottom of the decomposition compartment so as to reduce the mechanical resistance to flow of mercury through the compartments. The cathode structure of my invention is simple and inexpensive to construct and install and has a further advantage in that it is composed of units which are simple and inexpensive to replace. Withal, this cathode structure is considerably more efficient in bringing about amalgam decomposition than are conventional cathodes.

My invention contemplates, in apparatus in which an alkali metal from an anode of an amalgam of the alkali metal is reacted with a superposed body of aqueous electrolyte in contact with the anode to form hydrogen gas and hydroxide of the alkali metal in a compartment through which the amalgam moves, the combination which comprises a cathode formed of a plurality of substantially horizontal bars of graphite or carbon, held side by side and spaced from each other in said body, and a plurality of metal supports which project into the anode and rest upon the bottom of the compartment, said metal supports being low in electrical contact resistance with the cathode elements, the carbon or graphite bars, and supporting it above and out of contact with the bottom of the compartment.

In my preferred form of cathode structure the metal supports serve both as supports and as spacers for the graphite or carbon bars and are in the form of elongated substantially horizontally disposed metal plates or strips resting on edge and parallel to each other on the bottom of the compartment and having a series of apertures in which the bars are fitted so as to provide low resistance electrical contact. This structure is with advantage disposed in the compartment with the metal plates substantially parallel to the path of amalgam movement, so as to furnish minimum obstruction thereto, the amalgam flow thus being across the several carbon or graphite bars.

The metal supports, as explained hereafter, may take other forms but preferably are made of iron, nickel or other metal of relatively high electrical conductivity that tends to amalgamate but little, if at all, with the mercury of the amalgam.

The series of graphite bars and the associated spacers form a grid with a series of elongated slots between the bars. The cathode may be so disposed that these slots extend across the path of amalgam movement in the cell as previously described, or the slots may be arranged substantially parallel to the direction of amalgam movement, but in either case the carbon or graphite elements of the grid are positioned in contact with the amalgam.

My invention will be more thoroughly understood in the light of the following detailed description taken in conjunction with the accompanying drawings of presently preferred types of cathodes of my invention and in which Fig. 1 is a fragmentary elevation, partly in section, taken through the decomposition compartment of a mercury cell along the line of amalgam flow, and in which is disposed one form of the cathode structure of my invention (comprising graphite bars supported upon iron pins in contact with the amalgam);

Fig. 2 is a fragmentary section taken through the apparatus of Fig. 1 along the line A—A;

Fig. 3 is an elevation, partly in section, through the decomposition compartment of a mercury cell equipped with another form of the cathode of my invention having metallic contact pins or legs extending from the cathode grid through the amalgam to the bottom of the compartment;

Fig. 4 is an elevation, partly in section, taken through the apparatus of Fig. 3 along the section line B—B;

Fig. 5 is a plan view of the preferred form of cathode structure of my invention, the direction of amalgam flow in the cell being parallel to the members 98 and 99; and Fig. 6 is a fragmentary elevation, partly in section, taken through the decomposition compartment of a mercury cell along the line of amalgam flow, with the cathode structure of Fig. 5 resting upon the bottom of the compartment.

Referring now to Figs. 1 and 2, it will be observed that a conventional decomposition compartment 10 of a mercury cell having walls 11, 11A, 12, 12A and a substantially horizontal bottom 13 of insulating material is provided with a conduit 14 which enters the compartment at one side adjacent the bottom thereof and through which sodium amalgam is introduced to form a layer 15 at the bottom of the cell. The sodium amalgam for use in the decomposition compartment is produced in the conventional manner in an adjacent anode or amalgam-forming compartment 15A, fragmentarily shown.

The layer of sodium amalgam in the bottom of the decomposition compartment is overlaid by a body of aqueous electrolyte 16, such, for example, as an aqueous sodium hydroxide solution. Immersed within the electrolyte is a series of horizontally disposed elongated graphite bars 17, 18, 19, 20, 21, 22, 23, 24, 25. The lower edges of these bars are disposed in contact with the layer of amalgam. Vertical holes are drilled in the bottom of each of the bars to receive a series of cylindrical iron pins 26, 27, 28, 29, 30, 31, 32, 33, 34, 34A, 34B, which are fitted tightly into the holes, so as to make low resistance electrical contact with the graphite, and extend downwardly through the amalgam layer, resting upon the bottom of the decomposition compartment. The graphite bars are held in parallel spaced relationship by means of a pair of iron tie rods 35, 36, which extend horizontally through holes in the respective bars and through small annular spacers, 37, 38, 39, 40, 41, 42, 43, 44. The ends of the tie rods are secured by threaded nuts.

It will be observed that the pins serve as legs upon which the graphite cathode assembly rests, there being at least two pins disposed in opposite ends of each grid.

The balance of the structure of Fig. 1 and of Fig. 2 is that of a conventional mercury cell. In the amalgam-forming compartment, an anode is disposed in contact with an aqueous solution of sodium chloride underlaid by a layer of mercury that acts as cathode in the compartment and picks up the sodium formed by decomposition of the sodium chloride to form the amalgam which is decomposed in the cathode compartment. In this decomposition sodium is released from the amalgam and enters into a reaction with the water of the electrolyte in the decomposition compartment to form sodium hydroxide and hydrogen gas which is discharged from the surface of the cathode and is withdrawn from the compartment through a conventional hydrogen outlet 45, in a cover 45A.

Now referring to Figs. 3 and 4, it will be observed that the structure has a conventional decomposition compartment 46 having walls 47, 47A, 48, 48A, and a bottom 49 of insulating material. A layer 50 of sodium amalgam formed, for example, in an adjacent amalgam-forming compartment 51, is introduced into the bottom of the decomposition compartment through a conduit 52 and there comes in contact with an overlying pool of aqueous electrolyte 53, such as sodium hydroxide solution. In this case, a cathode 54 is formed of a plurality of elongated cylindrical graphite bars 55, 56, 57, 58, 59, 60, 61, 62, 63, 64, 65, disposed horizontally and spaced slightly above the layer of sodium amalgam. The major axes of the graphite cylinders are disposed transversely to the direction of amalgam flow, and each cylinder is supported on the bottom of the decomposition compartment by a pair of iron or nickel pins or legs 66, 67, which are fitted tightly into vertical holes drilled in the bottom of each cylinder. The pins rest upon the bottom of the decomposition compartment and pass through the layer of sodium amalgam in contact therewith.

Extending horizontally at right angles to the axes of the graphite cylinders are a pair of tie rods 68, 69 of iron, or the like. These rods pass through holes in the graphite cylinders and also through holes in small annular iron spacer members 70, 71, 72, 73, 74, 75, 76, 77, 78, 79, disposed respectively between adjacent cylinders. Nuts are threaded on the ends of the tie rods for tightening the assembly so that the graphite cylinders are held from each other in parallel spaced relationship.

The cathode structures described hereinbefore, and especially that illustrated in Figs. 3 and 4, are simple and efficient. However, the structure illustrated in Figs. 5 and 6 is equally efficient, simpler in design, cheaper to construct and more rugged, and is therefore preferred. Referring now to Figs. 5 and 6, it will be observed that the cathode structure comprises a series of horizontally disposed graphite rods or bars 80 to 97, inclusive. The bars are disposed parallel to each other and spaced a small distance apart, but at least ⅛ inch to insure adequate space for hydrogen discharge, being held in such position by a pair of metal spacer members 98, 99 which also serve to support the rods a short distance above the bottom 99 of a conventional decomposition compartment 100 of a mercury cell. The supports are provided with a series of circular apertures substantially the same in diameter as the rods, which are fitted tightly thereinto so as to afford good electrical contact.

Sodium amalgam to be decomposed in the decomposition compartment is formed in an adjacent amalgam-forming compartment 101, fragmentarily shown, and is passed through a lute or hydraulic seal 102 to form a layer 103 in the bottom of the compartment. The graphite rods are supported above the bottom of the compartment a distance slightly less than the thickness of the amalgam layer so that the rods make contact therewith over about one quarter of their surface, but do not interfere seriously in the flow of the mercury back and forth between the amalgam-forming compartment and the decomposition compartment. As illustrated in Fig. 6, the rods are disposed transversely to the path of amalgam movement while the supporting members are substantially parallel to the path of movement. The movement of the mercury against the rods aids in sweeping off hydrogen from them, thereby facilitating amalgam decomposition.

The amalgam layer in the decomposition compartment is covered by a pool of aqueous electrolyte 104, such as sodium hydroxide solution, which also covers the cathode structure. A space 105 for the reception of hydrogen discharged in the process is provided at the top of the compartment, which is closed by a cover 106 having a hydrogen outlet conduit 107.

The graphite rods may, of course, be of other than circular section but the latter is a convenient form, because it enables the apertures to be formed in the supporting members by drilling in a simple and accurate manner. The size of the rods may be varied depending upon the size of the compartment in which they are disposed. I have found, however, that graphite rods having a minimum diameter of 0.50 inch and a maximum diameter of 0.54 inch are desirable. Such rods may be spaced apart about one-eighth inch and the space between the rods thus provided is adequate for hydrogen discharge. With rods of the size described, I have found that the supports may be spaced from each other at least 12 inches without placing excessive stress on the rods. The spacers may be made conveniently of cold rolled steel strips of No. 2 temper, $\frac{1}{16}$ inch thick and $\frac{7}{8}$ inch wide, with the holes for the reception of the rods spaced along the center line thereof. It is desirable to press fit the graphite or carbon rods into the supporting members to insure adequate electrical contact.

In the event that the cathode must be removed for repair, it is easily lifted out of the compartment. Repair is also a simple matter in that broken rods may be driven out of the supporting members and a new rod driven or pressed in from the outside end of the structure.

Cathode assemblies, such as that illustrated in Figs. 3, 4, 5 and 6, in which the graphite bars or cylinders have their major axes transverse to the path of amalgam movement, are particularly desirable in that with such structures it is possible to maintain a very low concentration of alkali metal in the amalgam, thus increasing the current efficiency of the mercury cell in which the cathode is disposed. To illustrate, the cathode assembly similar to that illustrated in Figs. 3 and 4 was disposed in a Castner type cell with the axes of the cylinders disposed substantially parallel to the path of mercury movement, and it was found that the amalgam attained a sodium concentration of 0.022%. The cathode assembly was then turned 90° in the cell so that the major axes of the bars were at right angles to the path of mercury movement, and with all other conditions of operation remaining the same the concentration of sodium in the amalgam dropped to 0.018%, with consequent improvement in current efficiency.

It will be observed that the metal pins or legs or supports in the cathode assemblies illustrated herein keep the cathode elevated at a desirable height so that the amalgam may flow underneath and disposed at the optimum angle with respect to the direction of flow for good current efficiency.

The supports are best so dimensioned that the amalgam layer is in contact with the carbon or graphite elements when these elements are disposed transversely of the path of amalgam movement, as in Figs. 3, 4, 5 and 6. When the path of amalgam movement is substantially parallel to the major axes of the carbon or graphite bars the level of the amalgam also is with advantage maintained in contact with the bottom of the carbon or graphite bars, as in Figs. 1 and 2.

The following tests serve to illustrate the benefits to be derived from the use of metallic contact members for establishing low resistance electrical contact between graphite cathodes and an anode of mercury amalgam in accordance with my invention.

*Test No. 1*

A cube of graphite, the edges of which were all 1 cm. long, was placed on a layer of mercury amalgam containing approximately 0.1% sodium and both amalgam and cube were covered with an aqueous solution containing 30% by weight of sodium hydroxide. The graphite almost immediately became coated with a layer of hydrogen bubbles which did not become detached or released to any substantial degree and which seemed to insulate the graphite from the amalgam.

*Test No. 2*

The cube of graphite resting on the amalgam layer was weighted down so that its lower edge was approximately 3 mms. under the amalgam surface. There was a slight increase in the hydrogen evolution under these circumstances, but hydrogen bubbles again rapidly blanketed the graphite and appeared to act as insulation, inhibiting hydrogen evolution and consequently inhibiting the rate at which sodium was released from the amalgam.

*Test No. 3*

In this test a hole having a diameter of $\frac{1}{16}$ inch was drilled into one face of the graphite cube. A clean iron pin was driven into the hole so as to form a tight fit and was then cut off so that approximately $\frac{1}{16}$ inch of the pin protruded. The cube was then placed on the sodium amalgam under the sodium hydroxide solution with the iron pin in contact with the amalgam. Immediately there was a vigorous and continuing evolution of hydrogen from the graphite.

*Test No. 4*

A graphite cube was placed on a layer of sodium amalgam and both were immersed in a solution containing 30% by weight of sodium hydroxide. The potential developed between the graphite cube and the sodium amalgam under such circumstances was measured, and it was found that the drop between the graphite and the amalgam was 0.300 volt. A metal pin was then driven into a hole in the graphite cube and placed in contact with the amalgam. Under these circumstances, potential measurements showed a voltage drop of only 0.00038 volt between the graphite cube and the sodium amalgam.

In the light of the tests, it is clear that the metal supports of my invention aid greatly in reducing the contact resistance between the mercury and the graphite, and bring about a remarkable increase in the rates at which hydrogen is evolved from a graphite or carbon cathode and at which the alkali metal is released from the amalgam.

I claim:

1. In apparatus in which an alkali metal from an anode of an amalgam of the alkali metal is reacted with a superposed body of aqueous electrolyte in contact with the anode to form hydrogen gas and hydroxide of the alkali metal in a compartment through which the amalgam moves, the combination which comprises an approximately level grid composed of a plurality of cathode bars of a material selected from the group consisting of carbon and graphite and a plurality of metal spacer strips each provided with holes into which the bars project in good electrical contact with the strips, the bars being held side by side but spaced from each other by the strips and supported by the strips in the body in contact with the amalgam but out of contact with the bottom of the compartment, with the strips resting upon said bottom in contact with the amalgam.

2. In apparatus in which an alkali metal from an anode of an amalgam of the alkali metal is reacted with a superimposed body of aqueous electrolyte in contact with the anode to form hydrogen gas and hydroxide of the alkali metal in a compartment through which the amalgam moves, the combination which comprises an approximately level grid composed of a plurality of cathode bars of a material selected from the group consisting of carbon and graphite and a plurality of metal spacer strips each provided with holes into which the bars project in good electrical contact with the strips, the bars being held side by side but spaced from each other by the strips and supported by the strips in the body in contact with the amalgam but out of contact with the bottom of the compartment with the strips resting upon the bottom in contact with the amalgam and extending in the direction of amalgam movement and transverse to the major axes of the bars.

WILLIAM C. GARDINER.